US008413217B2

(12) United States Patent
Bhatia

(10) Patent No.: US 8,413,217 B2
(45) Date of Patent: Apr. 2, 2013

(54) SYSTEMS AND METHODS FOR CONTROLLING OPERATION OF A MOBILE STATION

(75) Inventor: Ashok Bhatia, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 402 days.

(21) Appl. No.: 12/398,047

(22) Filed: Mar. 4, 2009

(65) Prior Publication Data

US 2010/0229217 A1  Sep. 9, 2010

(51) Int. Cl.
    G06F 21/00 (2006.01)
(52) U.S. Cl. ............ 726/4; 726/3; 726/18; 726/21; 713/186; 382/115
(58) Field of Classification Search .......... 726/4, 18–21, 726/44; 382/115
    See application file for complete search history.

(56) References Cited

U.S. PATENT DOCUMENTS

| | | | |
|---|---|---|---|
| 6,934,625 B2* | 8/2005 | Haddad | 701/517 |
| 7,110,753 B2 | 9/2006 | Campen | |
| 7,197,321 B2* | 3/2007 | Erskine et al. | 455/456.1 |
| 7,881,710 B2* | 2/2011 | Keohane et al. | 455/418 |
| 7,944,885 B2* | 5/2011 | Tariq et al. | 370/331 |
| 7,945,470 B1* | 5/2011 | Cohen et al. | 455/433 |
| 2004/0166878 A1* | 8/2004 | Erskine et al. | 455/456.1 |
| 2007/0004413 A1* | 1/2007 | Mahajan et al. | 455/441 |
| 2007/0124395 A1* | 5/2007 | Edge et al. | 709/206 |
| 2007/0264981 A1* | 11/2007 | Miller | 455/414.1 |
| 2008/0064446 A1* | 3/2008 | Camp et al. | 455/565 |
| 2008/0070561 A1* | 3/2008 | Keum et al. | 455/419 |
| 2008/0186625 A1 | 8/2008 | Yang | |
| 2009/0098855 A1* | 4/2009 | Fernandez et al. | 455/410 |

FOREIGN PATENT DOCUMENTS

| | | |
|---|---|---|
| CN | 101068383 A | 11/2007 |
| CN | 101115099 A | 1/2008 |
| EP | 1737193 | 12/2006 |
| EP | 1737193 A1 * | 12/2006 |
| JP | 2001078264 A | 3/2001 |

(Continued)

OTHER PUBLICATIONS

Espacenet search result, Espacenet Result List, Jan. 2012.*

(Continued)

*Primary Examiner* — Andy Rao
*Assistant Examiner* — Shan Elahi
(74) *Attorney, Agent, or Firm* — Jennifer M. Pascua

(57) ABSTRACT

Systems, apparatuses, and methods disclosed herein allow a requesting party to control use of another user's mobile station. In some aspects, a server is configured to communicate with a plurality of remote computer systems and target mobile stations. The server includes a memory device and a processor configured to access data and logic instructions embedded on the memory device. The server authenticates a requesting party accessing the computer server from one of the remote communication systems. The requesting party is not a user of a selected one of the target mobile stations. The server receives selective availability attributes for the selected one of the target mobile stations from the requesting party. The selective availability attributes indicate conditions under which the target mobile station is enabled or disabled to operate, and features that are available on the target mobile station under a plurality of conditions when the target mobile station is enabled. The server further determines when the target mobile station is operational and downloads the selective availability attributes to the target mobile station when the target mobile station is operational.

30 Claims, 4 Drawing Sheets

FOREIGN PATENT DOCUMENTS

| | | | |
|---|---|---|---|
| JP | 2002247642 A | | 8/2002 |
| JP | 2004312439 A | | 11/2004 |
| JP | 2006510987 A | | 3/2006 |
| JP | 2006186625 A | | 7/2006 |
| JP | 2006295387 A | | 10/2006 |
| WO | WO2004057485 | | 7/2004 |
| WO | WO 2004057485 A1 * | | 7/2004 |
| WO | WO2005/062642 A1 * | | 7/2005 |
| WO | WO2005062642 A1 | | 7/2005 |
| WO | WO 2005062642 A1 * | | 7/2005 |
| WO | WO 2008/008880 A2 * | | 1/2008 |
| WO | WO2008008880 | | 1/2008 |
| WO | WO 2008008880 A2 * | | 1/2008 |

OTHER PUBLICATIONS

International Search Report—PCT/US2010/026254—International Search Authority, European Patent Office, Aug. 30, 2010.

Written Opinion—PCT/US2010/026254,—ISA/EPO—Aug. 30, 2010.

"2002 Lexus Navigation System Owner's Manual", Lexus, 2002, p. iii.

* cited by examiner

SYSTEMS AND METHODS FOR CONTROLLING OPERATION OF A MOBILE STATION

BACKGROUND

1. Field

This disclosure generally relates to selective operation of a mobile station. More specifically, the disclosure pertains to systems and methods for disabling selected features of a mobile station while the mobile station is in motion.

2. Background

In some accidents, it is discovered that an operator was attempting to use a device such as a mobile phone while they should have been concentrating on operating their vehicles. For example, an operator may try to input text while driving, divert their attention from driving when incoming calls are received, and/or read/respond to email while driving. Such problems can also occur during operation of other machinery, leading to increased potential for accidents. Several states in U.S. have tried to enact laws to prohibit the use of such devices while operating vehicles, but the laws are difficult to enforce consistently.

SUMMARY

Systems, apparatuses, and methods disclosed herein allow a requesting party to control use of another user's mobile station. In some aspects, a server is configured to communicate with a plurality of remote computer systems and target mobile stations. The server includes a memory device and a processor configured to access data and logic instructions embedded on the memory device. The server authenticates a requesting party accessing the computer server from one of the remote communication systems. The requesting party is not a user of a selected one of the target mobile stations. The server receives selective availability attributes for the selected one of the target mobile stations from the requesting party. The selective availability attributes indicate conditions under which the target mobile station is enabled or disabled to operate, and features that are available on the target mobile station under a plurality of conditions when the target mobile station is enabled. The server further determines when the target mobile station is operational and downloads the selective availability attributes to the target mobile station when the target mobile station is operational.

In other aspects, a mobile station includes a processor and a computer-readable medium comprising code operable to cause the processor to receive and store selective availability attributes from a central server. The selective availability attributes indicate conditions under which the mobile station is enabled or disabled to operate, and features that are available on the mobile station under a plurality of conditions when the target mobile station is enabled. The mobile station is further operable to send a message to the centralized server indicating whether the selective availability attributes have been successfully downloaded to the mobile station.

In another aspect, a mobile device includes one or more motion sensors configured to detect motion of the mobile device. The mobile device further includes control logic to determine whether the detected motion of the mobile device indicates device control of one or more functions of the mobile device is to be initiated, and further includes control logic to change the availability of one or more functions of the mobile device if the detected motion of the mobile station indicates that device control of one or more functions of the mobile device is to be initiated.

The mobile device may further include memory storing time limitation information indicative of one or more time intervals during which device control may be initiated and control logic to compare a current time to the time limitation information to determine whether the current time is included in the one or more time intervals. The availability of the one or more functions of the mobile device may be changed if the detected motion of the mobile station indicates that device control of one or more functions of the mobile device is to be initiated and if the current time is included in the one or more time intervals. The mobile device may further comprise a processor, and the control logic may comprise executable instructions stored in a computer readable medium to be executed by the processor. The control logic may comprise one or more gates implemented in hardware and/or firmware.

The control logic to change the availability of one or more functions of the mobile device may comprise control logic to disable one or more functions selected from the group consisting of voice messaging, text messaging, and game functionality.

DETAILED DESCRIPTION

The nature, objectives, and advantages of the disclosed method and apparatus will become more apparent to those skilled in the art after considering the following detailed description in connection with the accompanying drawings.

Figure 1:
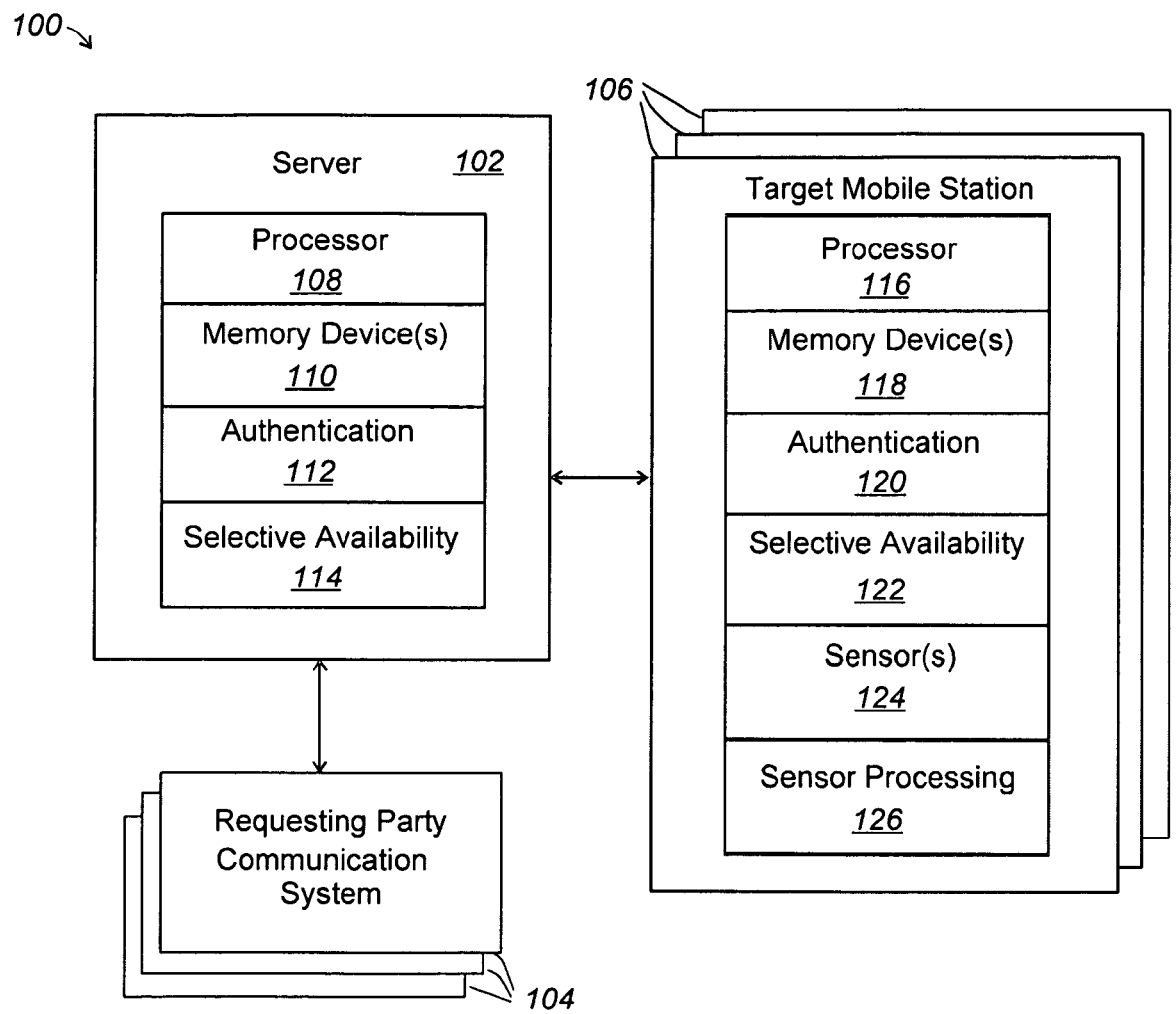
FIG. 1 is a simplified block diagram of a communication network of the disclosed systems and methods.

FIG. 1 illustrates, in block diagram form, a communication network 100 including a computer server 102 configured to communicate with one or more remote communication systems 104 and target mobile stations 106. Server 102 includes a processor 108 configured to access data and logic instructions embedded on memory device(s) 110, authentication module 112, and selective availability module 114. Processor 108 can include any suitable computer-processing device that accesses memory device(s) 110 for storing and executing logic instructions, and is capable of interfacing with other modules and processing systems. Various input/output devices, such as a graphical user interface, an audio user interface, keyboard, and mouse can be included to allow a user to interact with server 102.

Selective availability module 114 includes logic instructions and data (also referred to as "attributes") that indicate conditions under which a target mobile station 106 is operationally enabled or disabled as well as features that are available on the target mobile station 106 when the target mobile station 106 is enabled. For example, the attributes may specify which features are available and/or restricted on target mobile station 106 while the mobile station 106 is moving faster than a specified speed. As another example, the attributes may restrict features available on the mobile station 106 during a specified time period.

Selective availability module 114 allows a requesting party to control availability of various features the target mobile station 106 under various conditions. The requesting party may be a parent, teacher, employer, or other person in a position of authority or control with respect to the user of the mobile station 106. The ability to enable and disable available features can be used in a variety of situations, for example, preventing inexperienced drivers from using non-emergency features on target mobile station 106 while driving (i.e., the car is in motion), preventing employees from using target mobile station 106 while operating machinery, preventing employees from accessing features unrelated to work during work hours, and preventing students from sending text messages or playing games during school hours.

Authentication module 112 includes logic instructions to authenticate a requesting party attempting to access authentication module 112 from one of the remote communication systems 104. Authentication module 112 can use one or more techniques for proving identity such as a username and a password, a smart card, voice recognition, and/or other suitable identification technique that can be used between server 102 and communication system 104. Once identified, authentication module 112 can determine whether the requesting party is permitted to provide and/or modify selective availability attributes for one or more target mobile devices 106.

When a requesting party is authenticated and allowed access to selective availability attributes for one or more target mobile stations 106, selective availability module 114 can allow the requesting party to view and modify the selective availability attributes currently downloaded in selected target mobile station(s) 106. Selective availability module 114 can further determine whether more than one target mobile station 106 is associated with the requesting party. If so, selective availability module 114 can generate options for the requesting party to select one or more of the associated target mobile stations 106. Selective availability module 114 can also allow the requesting party to specify different sets of selective availability attributes for different target mobile stations 106.

More than one requesting party can be associated with the same target mobile station 106. Requesting parties can be associated with one or more roles, and the ability to restrict or enable various features on the selected target mobile station(s) 106 can depend on the role of the requesting party. For example, a teacher or employer may be restricted to controlling features available from the mobile station 106 during school or work hours. Parents may have the ability to control availability of various features at any time, as well as to override settings provided by other requesting parties. A requesting party with overall control of the mobile station 106 may define roles for and allow access to other requesting parties and the features and conditions each role is allowed to control.

In some aspects, the requesting party communication system(s) 104 can include any suitable computer-processing device that accesses memory for storing and executing logic instructions, and is capable of interfacing with other processing systems, such as server 102. Any suitable communication protocol can be used to communicate between server 102, communication system(s) 104, and mobile station(s) 106. For example, communication system(s) 104 can communicate with server 102 via a plain old telephone system (POTS), an information network such as the Internet using a coaxial cable, fiber optic cable, twisted pair, digital subscriber line (DSL), and/or other suitable method for transferring data between communication systems 104 and server 102. Various input/output devices, such as a graphical user interface, an audio user interface, keyboard, and mouse can be included in communication systems 104 to allow a user to view and modify selective availability attributes on server 102, depending on access rights associated with the user's role.

Server 102 can determine when the target mobile station 106 is operational in any suitable manner and download the selective availability attributes to the target mobile station when the target mobile station is operational.

In some embodiments, the requesting party's communication system 104 can perform at least some of the functions of server 102 and communicate directly with mobile station(s) 106, thus eliminating the need for server 102.

Server 102 can receive a message from the target mobile station(s) 106 indicating whether the selective availability attributes are successfully downloaded to the target mobile station(s) 106. Server 102 can then send a second message to the requesting party communication system 104 indicating whether the selective availability attributes have been successfully downloaded to the target mobile station(s) 106.

Mobile station(s) 106 can include a processor 116 configured to access data and logic instructions embedded on memory device(s) 118, authentication module 120, and selective availability module 122. Mobile station(s) 106 can also include one or more sensors 124 and sensor processing module 126 that provide information regarding the position, speed, time of day, date, and other relevant parameters. For example, mobile station 106 may receive signals from satellites 130, which may be from a Global Positioning System (GPS), Galileo, GLONASS, NAVSTAR, GNSS, a system that uses satellites from a combination of these systems, or any SPS developed in the future, each referred to generally herein as a Satellite Positioning System (SPS). As used herein, an SPS will also be understood to include pseudolite systems, which are not satellites but perform functions commonly performed by satellites. One important type of sensors 124 are motion sensors; for example, accelerometers, gyroscopes, and the like that can provide information about motion of the mobile station 106. Herein, the term "motion sensor" refers to a sensor that directly senses motion of the mobile station 106 rather than inferring the motion from other types of measurements (for example, from one or more position measurements using satellites and/or terrestrial stations). Sensor processing module 126 can include filters, analog to digital conversion, amplifiers, and other suitable components for conditioning the sensor signals for use with selective availability module 122.

Mobile station 106 may be a portable device such as a cellular telephone, wireless communication device, user equipment, laptop computer, or other personal communication system (PCS) device. Processor 116 can include any suitable computer-processing device that accesses memory device(s) 118 for storing and executing data and logic instructions, and is capable of interfacing with other processing systems. Various input/output devices, such as a graphical user interface, an audio user interface, keyboard, and other data input device can be included to allow a user to interact with mobile station 106.

Mobile station(s) 106 can receive and store selective availability attributes from server 102. Selective availability module 122 can control whether the mobile station 106 is enabled or disabled as well as features that are available on the mobile station(s) 106 under various conditions when the target mobile station is enabled. Mobile station 106 can send a message to the server 102 indicating whether the selective availability attributes have been successfully downloaded to the mobile station 106. In other aspects, authentication module 120 can require authentication information from server 102 before receiving and storing the selective availability attributes.

Various wireless communication networks based on infrared, radio, and/or microwave technology can be used between server 102, communication systems 104, and target mobile stations 106. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
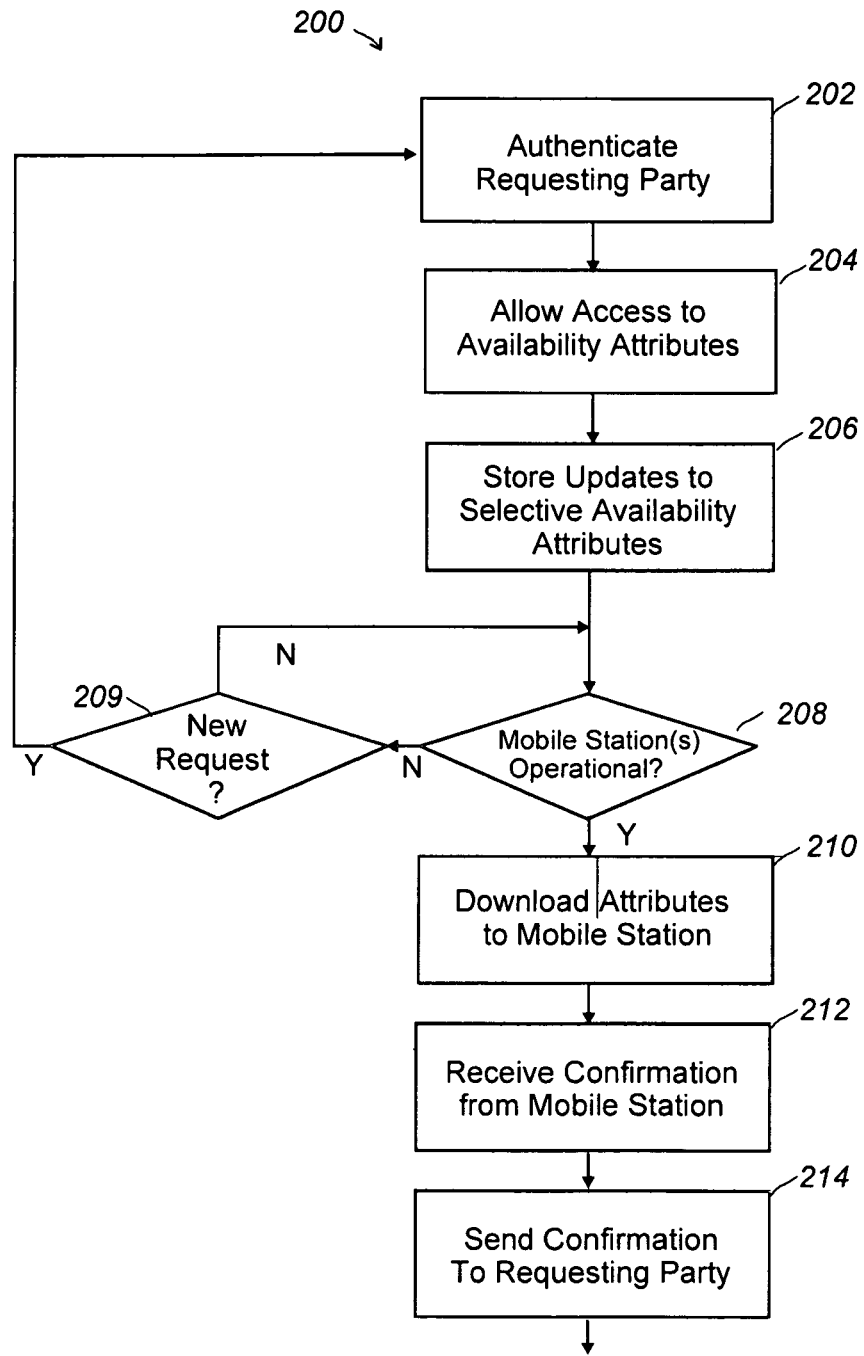
FIG. 2 shows a flow diagram of an example of a process that may be performed by a server to receive the selective availability attributes and download the attributes to a mobile station.

Referring to FIG. 2, a flow diagram of an example of a method 200 for controlling features available on a mobile station (106) (FIG. 1) is shown that may be implemented in computer server (102) (FIG. 1). Authentication process 202 includes authenticating a requesting party accessing the computer server from a remote communication system (104) (FIG. 1). Authentication process 202 can use one or more techniques for proving identity such as a username and a password, a smart card, voice recognition, and/or other suitable identification technique.

Once identified, process 204 can determine whether the requesting party is permitted to provide and/or modify selective availability attributes for one or more target mobile devices. For example, all of the cell phones that are included in a family service plan or a business service plan may be available to the requesting party. Information for each mobile station may be stored that includes the requesting parties that are allowed to access the availability attributes for the mobile station, as well as the features on the mobile phone that each requesting party has enabled or disable under various conditions. At least one requesting party can take the role of administrator and create/assign roles for other requesting parties that typically have more limited access rights than the administrator. The access rights of the requesting parties can depend on the assigned roles. The administrator may also have access to override the attributes defined by other requesting parties.

Process 204 can include allowing the requesting party to access attributes stored in memory on the server via a suitable user interface such as a web browser, or an audio interface with voice prompts and voice or keypad responses 14. The method of Claim 11, further comprising determining a plurality of target mobile stations associated with the requesting party; presenting options to select one of the target mobile stations associated with the requesting party; and allowing the requesting party to specify different sets of selective availability attributes for different ones of the plurality of the target mobile stations. The requesting party may view and modify the selective availability attributes currently downloaded in the target mobile station. In other implementations, the requesting party may store and edit the data on their own communication system and transfer a file including new/updated attributes to the server.

Process 206 can include storing new/updated selective availability attributes for a target mobile station from the requesting party. The selective availability attributes indicate conditions under which the target mobile station is enabled or disabled to operate, and features that are available on the target mobile station under a plurality of conditions when the target mobile station is enabled.

Process 208 can include determining when the target mobile station is operational, and process 210 can include downloading the selective availability attributes to the target mobile station when the target mobile station is operational. If the mobile station is not operational, then process 209 can loop back to process 208 until the mobile station becomes operational, or a new request to add/modify the attributes is detected that causes a transfer to process 202.

Process 212 can include receiving a message from the target mobile station indicating whether the selective availability attributes are successfully downloaded to the target mobile station. Process 214 can include sending a message from the server to the requesting party's communication system indicating whether the selective availability attributes have been successfully downloaded to the target mobile station.

Figure 3:
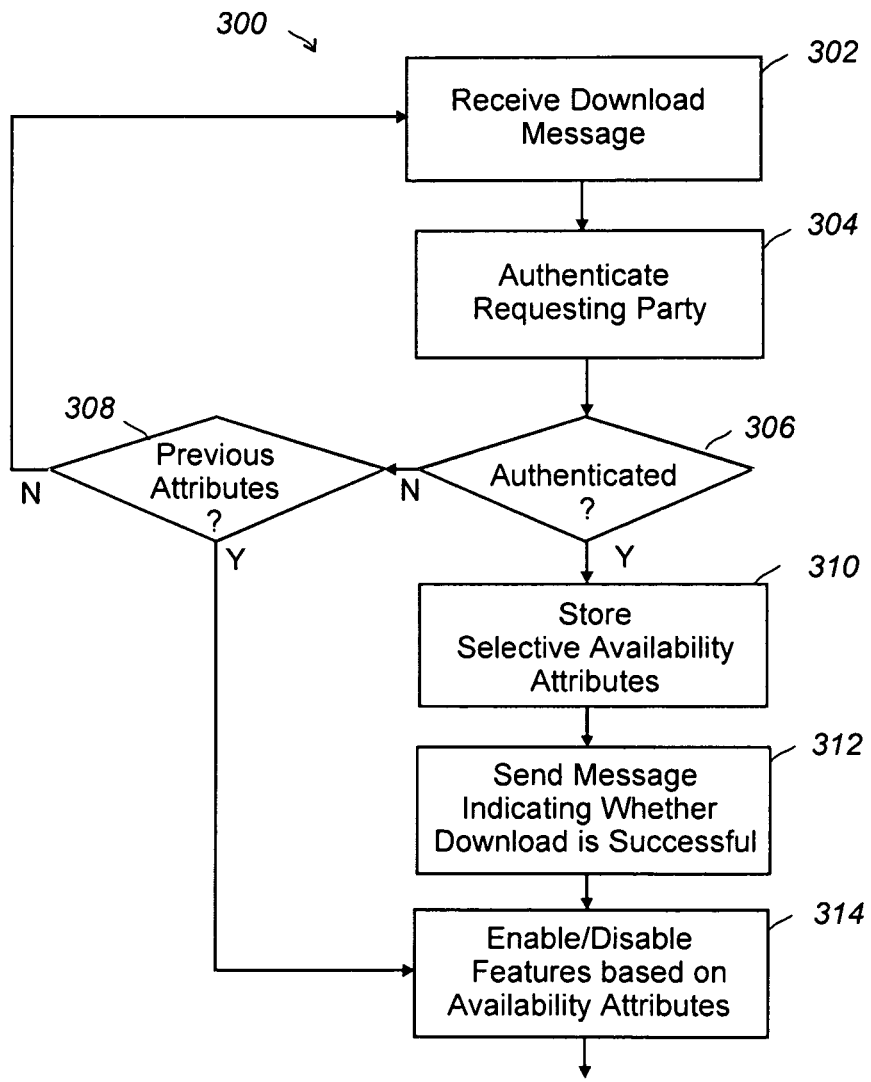
FIG. 3 shows a flow diagram of an example of a process that may be performed by a mobile station to receive and implement the selective availability attributes.

Referring to FIG. 3, a flow diagram of an example of a method 300 that may be implemented in mobile station (106) (FIG. 1) for controlling features available on the mobile station is shown. Process 302 can include receiving a download message with selective availability attributes in the mobile station from a server (104), from a requesting party's communication system (104) (FIG. 1), or from another source. The selective availability attributes specify conditions under which the mobile station is enabled or disabled to operate, and features that are available on the mobile station when the target mobile station is enabled.

The download message can include authentication information for the requesting party. Process 304 can include checking the authentication information of the requesting party before storing the selective availability attributes. One purpose of authenticating the message is to prevent the user of the mobile station (or other unauthorized party) from modifying or deleting the availability attributes.

If the message/requesting party is not authenticated, process 306 transitions from process 304 to process 308 to determine whether availability attributes were previously stored in the mobile station. If so, then process 308 transitions to process 314 to enable/disable features on the mobile station based on the previously stored availability attributes. Otherwise, process 308 returns to process 302 to wait for another download message.

If the message/requesting party is authenticated, process 306 transitions from process 304 to process 310 to store the availability attributes in the mobile station. Process 310 can include replacing the entire set of availability attributes, or updating only those attributes that have been added, deleted, or modified with the most recent download. The message can include a parameter that indicates whether the data being sent is a full replacement or a partial update.

Process 312 can include sending a message to the server and/or requesting party's communication device indicating whether the selective availability attributes have been successfully downloaded to the mobile station. Process 314 includes activating the new availability attributes in the mobile station.

The conditions and availability attributes can cover a variety of situations where the requesting party wishes to control use of the mobile station. For example, the availability attributes may specify the following:

- disable Short Message Service (SMS) delivery from 9:00 to 11:00 a.m. when the mobile station is moving greater than a specified speed;
- disable all games from 9 a.m. to 3:00 p.m., which is typically school time for children;
- specify a list of numbers from which incoming/outgoing calls are allowed when in the mobile device is traveling greater than a specified speed;
- specify a "time of expiry" field that defines the time the attributes are to remain in effect.

Figure 4:
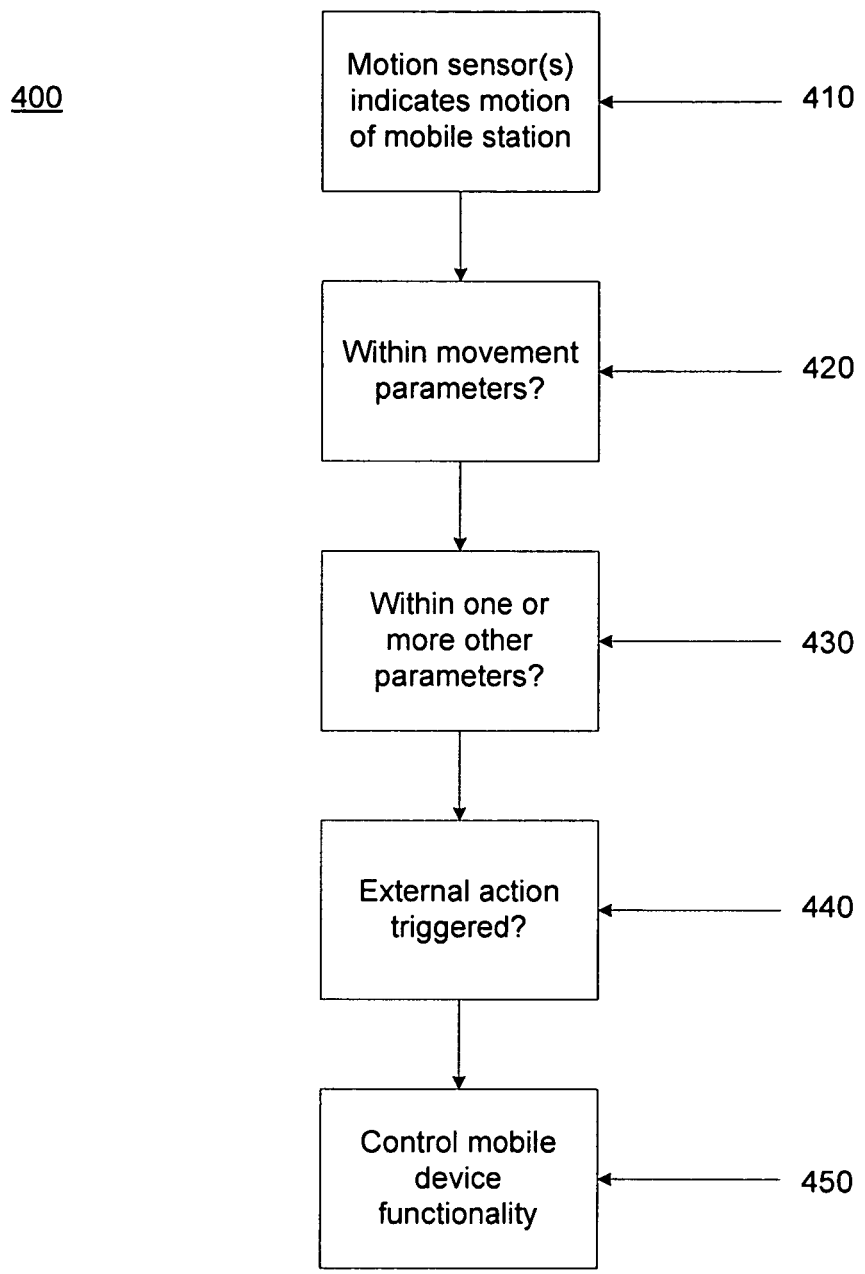
FIG. 4 shows a flow diagram of techniques using motion sensors.

As noted above, motion sensors are one important type of sensor that may be included in a mobile device. FIG. 4 shows a process 400 that may be used with a mobile device incorporating one or more motion sensors (such as accelerometers, gyroscopes, and the like). The motion sensor(s) may include one or more sensors to provide information about motion in a particular number of degrees of freedom, depending on the design of the mobile device and the need for particular information. However, herein we discuss motion sensors in general without limitation on the number of degrees of freedom obtained or number of combination of sensor(s) used.

At 410, one or more motion sensors may indicate motion of the device. For example, an accelerometer may indicate that the mobile device is moving, after having been stationary for a period of time. At 420, the mobile device may determine whether the detected motion is within particular parameters, which may be controlled from outside the device (as discussed in detail above), or which may be provided in a different manner. For example, the mobile device may determine if the detected movement corresponds to walking or driving. If the detected movement corresponds to walking, the mobile device may respond in one way, while if the detected movement corresponds to driving, the mobile device may respond in a different way.

At 430, the mobile device may optionally determine whether the mobile device environment is within one or more additional parameters. For example, the mobile device may determine whether the current time is within one or more selected time intervals. In another example, the mobile device may determine whether the current location is within one or more selected regions. At 440, the mobile device may optionally determine whether external action is triggered. For example, if the motion sensors indicate that the detected movement corresponds to driving, and the time is within a time interval during which the user of the mobile device is not expected to be driving, the mobile device may transmit a communication indicating that an alert (such as a text message to a parent) should be sent.

At 450, the device functionality may be controlled, based on the detected movement and (in some examples) based on other detected parameters. In one example, the mobile device may include a satellite positioning system (SPS) receiver. The mobile device could determine its position and velocity using SPS measurements and some functionality of the device controlled using SPS information. However, such a technique would come at a significant power cost. Therefore, in one implementation of the current system, the SPS system is not activated until information from one or more motion sensors indicates that it should be. This control may be combined with other parameters to provide efficient control of the mobile device.

For example, if the mobile device belongs to a young driver who is expected to drive to school some time between 7:30 and 8:00 a.m., the mobile device can be provided with instructions (e.g., from the parent setting up a device profile at an external computer, at the device, or in another manner) to activate the SPS system once the motion sensor detects motion associated with driving. The velocity of the mobile device can be determined using the SPS system. While the velocity indicates that the mobile device is in a car, other functionality of the mobile device can be controlled. For example, voice communications can be limited or disabled, text messaging can be limited or disabled, games can be limited or disabled, and the like. In another example, a signal from the motion sensor can be used to indicate that the SPS system should be activated, so a geofencing technique can be initiated. Of course, many implementations are possible, and the aspects above may be combined in different ways to provide particular benefits.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A system for remotely controlling availability of features on a mobile station comprising:
    a computer server to communicate with a plurality of remote computer systems and target mobile stations, the server including a memory device and a processor to access data and logic instructions stored on the memory device;
    wherein the logic instructions are executable by the processor to:
    authenticate a requesting party accessing the computer server from one of the remote communication systems;
    process received selective availability attributes for the selected one of the target mobile stations from the requesting party, the selective availability attributes indicating conditions under which the target mobile station is enabled or disabled to operate, and features that are available on the target mobile station under a plurality of conditions at least partially in response to the target mobile station being enabled;
    in response to a determination that the target mobile station is operational, initiate downloading of the selective availability attributes to the target mobile station; and
    initiate transmission of an alert message to the requesting party in response to receiving a communication from the target mobile station indicating that a detected condition of the target mobile station contravenes an expected condition of the mobile station, the expected condition of the mobile device being based, at least in part, on at least one of the selective availability attributes as downloaded.

2. The system for remotely controlling availability of features on a mobile station of claim 1, wherein the logic instructions are further executable by the processor to:
    process a first message received from the target mobile station indicating whether the selective availability attributes have been successfully downloaded to the selected one of the target mobile stations; and
    initiate transmission of a second message to the requesting party indicating whether the selective availability attributes have been successfully downloaded to the selected one of the target mobile stations.

3. The system for remotely controlling availability of features on a mobile station of claim 1, wherein the logic instructions are further executable by the processor to:
    allow the requesting party to view and modify the selective availability attributes currently downloaded in the selected one of the target mobile stations.

4. The system for remotely controlling availability of features on a mobile station of claim 1, wherein the logic instructions are further executable by the processor to:
    determine a plurality of target mobile stations associated with the requesting party;
    present options to select one of the target mobile stations associated with the requesting party; and
    allow the requesting party to specify different sets of selective availability attributes for different ones of the plurality of the target mobile stations.

5. The system for remotely controlling availability of features on a mobile station of claim 1, further comprising:
    the selective availability attributes restrict features available on the target mobile station while the target mobile station is moving faster than a specified speed.

6. The system for remotely controlling availability of features on a mobile station of claim 1, further comprising:
    the selective availability attributes restrict features available on the target mobile station during a specified time period.

7. A mobile station comprising:
    a processor;
    a non-transitory computer-readable medium comprising:
    code executable by the processor to:
    process and store selective availability attributes received from a central server, the selective availability attributes indicating conditions under which the mobile station is enabled or disabled to operate, and features that are available on the mobile station under a plurality of conditions at least partially in response to the target mobile station being enabled;
    transmit a message to the central server indicating whether the selective availability attributes have been successfully downloaded to the mobile station; and
    transmit a communication to the central server indicating that a detected condition of the target mobile station contravenes an expected condition of the mobile station, the expected condition of the mobile device being based, at least in part, on at least one of the selective availability attributes as downloaded.

8. The mobile station of claim 7, wherein the logic instructions are further executable by the processor to:
    restrict features available on target mobile station at least partially in response to the mobile station moving faster than a speed specified in the selective availability attributes.

9. The mobile station of claim 7, wherein the logic instructions are further executable by the processor to:
    restrict features available on the mobile station during a time period specified in the selective availability attributes.

10. The mobile station of claim 7, wherein the logic instructions are further executable by the processor to:
    require authentication information before storing the selective availability attributes.

11. A method of remotely controlling availability of features on a mobile station comprising:
    authenticating a requesting party accessing a computer server from a remote communication system;
    receiving selective availability attributes for a target mobile station from the requesting party, wherein the requesting party is not a user of the target mobile station, the selective availability attributes indicating conditions under which the target mobile station is enabled or disabled to operate, and features that are available on the target mobile station under a plurality of conditions at least partially in response to the target mobile station being enabled;

in response to a determination that the target mobile station is operational downloading the selective availability attributes to the target mobile station; and transmitting an alert message to the requesting party in response to receiving a communication from the target mobile station indicating that a detected condition of the target mobile station contravenes an expected condition of the mobile station, the expected condition of the mobile device being based, at least in part, on at least one of the selective availability attributes as downloaded.

12. The method of claim 11, further comprising:

receiving a first message from the target mobile station indicating whether the selective availability attributes have been successfully downloaded to the target mobile station; and transmitting a second message to the requesting party indicating whether the selective availability attributes have been successfully downloaded to the target mobile station.

13. The method of claim 11, further comprising:

allowing the requesting party to view and modify the selective availability attributes currently downloaded in the target mobile station.

14. The method of claim 11, further comprising:

determining a plurality of target mobile stations associated with the requesting party;

presenting options to select one of the target mobile stations associated with the requesting party; and allowing the requesting party to specify different sets of selective availability attributes for different ones of the plurality of the target mobile stations.

15. The method of claim 11, wherein the selective availability attributes restrict features available on the target mobile station while the target mobile station is moving faster than a specified speed.

16. The method of claim 11, wherein the selective availability attributes restrict features available on the target mobile station during a specified time period.

17. A method of remotely controlling availability of features on a mobile station comprising:

receiving and storing selective availability attributes in a mobile station, the selective availability attributes indicating conditions under which the mobile station is enabled or disabled to operate, and features that are available on the mobile station when the target mobile station is enabled, wherein the availability attributes are generated by a requesting party and the availability attributes cannot be modified or deleted by the user of the mobile station;

transmitting a message to a server indicating whether the selective availability attributes have been successfully downloaded to the mobile station; and transmitting a communication to the server indicating that a detected condition of the target mobile station contravenes an expected condition of the mobile station, the expected condition of the mobile device being based, at least in part, on at least one of the selective availability attributes as downloaded.

18. The method of claim 17, further comprising:

restricting features available on target mobile station while the mobile station is moving faster than a speed specified in the selective availability features.

19. The method of claim 17, further comprising:

restricting features available on the mobile station during a time period specified in the selective availability attributes.

20. The method of claim 17, further comprising:

requiring authentication information before storing the selective availability attributes.

21. A computer server for remotely controlling availability of features on a mobile station comprising:

means for authenticating a requesting party accessing a computer server from a remote communication system;

means for receiving selective availability attributes for a target mobile station from the requesting party, the selective availability attributes indicating conditions under which the target mobile station is enabled or disabled to operate, and features that are available on the target mobile station under a plurality of conditions at least partially in response to the target mobile station being enabled means for downloading the selective availability attributes to the target mobile station; and means for providing an alert message to the requesting party in response to receiving a communication from the target mobile station indicating that a detected condition of the target mobile station contravenes an expected condition of the mobile station, the expected condition of the mobile device being based, at least in part, on at least one of the selective availability attributes as downloaded.

22. The computer server for remotely controlling availability of features on a mobile station of claim 21, further comprising:

means for receiving a first message from the target mobile station indicating whether the selective availability attributes have been successfully downloaded to the target mobile station; and means for transmitting a second message to the requesting party indicating whether the selective availability attributes have been successfully downloaded to the target mobile station.

23. The computer server for remotely controlling availability of features on a mobile station of claim 21, further comprising:

means for allowing the requesting party to view and modify the selective availability attributes currently downloaded in the target mobile station.

24. The computer server for remotely controlling availability of features on a mobile station of claim 21, further comprising:

means for determining a plurality of target mobile stations associated with the requesting party;

means for presenting options to select one of the target mobile stations associated with the requesting party; and means for allowing the requesting party to specify different sets of selective availability attributes for different ones of the plurality of the target mobile stations.

25. The computer server for remotely controlling availability of features on a mobile station of claim 21, wherein the selective availability attributes restrict features available on the target mobile station while the target mobile station is moving faster than a specified speed.

26. The computer server for remotely controlling availability of features on a mobile station of claim 21, wherein the selective availability attributes restrict features available on the target mobile station during a specified time period.

27. A mobile station comprising:

means for receiving and storing selective availability attributes in a mobile station from a server, the selective availability attributes indicating conditions under which the mobile station is enabled or disabled to operate, and features that are available on the mobile station under a plurality of conditions when the target mobile station is enabled;

means for transmitting a message to the server indicating whether the selective availability attributes have been successfully downloaded to the mobile station; and means for transmitting a communication to the server indicating that a detected condition of the target mobile station contravenes an expected condition of the mobile station, the expected condition of the mobile device being based, at least in part, on at least one of the selective availability attributes as downloaded.

28. The mobile station of claim 27, further comprising:
means for restricting features available on target mobile station while the mobile station is moving faster than a specified speed based on the selective availability features.

29. The mobile station of claim 27, further comprising:
means for restricting features available on the mobile station during a specified time period based at least in part on the selective availability attributes.

30. The mobile station of claim 27, further comprising:
means for requiring authentication information before storing the selective availability attributes.

* * * * *